United States Patent

[11] 3,626,290

| [72] | Inventor | Edward E. Aslan<br>Plainview, N.Y. |
|---|---|---|
| [21] | Appl. No. | 686,914 |
| [22] | Filed | Nov. 30, 1967 |
| [45] | Patented | Dec. 7, 1971 |
| [73] | Assignee | The Narda Microwave Corporation<br>Plainview, N.Y. |

[54] HIGH-FREQUENCY POWER MEASURING CIRCUIT EMPLOYING TWO SELF-BALANCING BRIDGES
7 Claims, 3 Drawing Figs.

[52] U.S. Cl. .................................................... 324/106, 324/95
[51] Int. Cl. .................................................... G01r 5/26, G01r 21/00
[50] Field of Search .......................................... 324/106, 95, 43, 65, 65 B; 323/75 A

[56] References Cited
UNITED STATES PATENTS

| 1,681,047 | 8/1928 | Porter | 324/65 X |
| 2,476,384 | 7/1949 | Razek | 324/65 X |
| 2,269,584 | 1/1942 | Eldredge | 324/43 X |
| 2,565,922 | 8/1951 | Howard | 324/106 |
| 2,997,652 | 8/1961 | Engen | 324/106 |
| 3,048,778 | 8/1962 | Rumpel | 324/95 |
| 2,437,449 | 3/1948 | Ames, Jr. et al. | 324/95 |
| 2,801,388 | 7/1957 | Ruge | 323/75 X |

Primary Examiner—Rudolph V. Rolinec
Assistant Examiner—Ernest F. Karlsen
Attorney—McGregor and Eisenman

ABSTRACT: A high-precision circuit for measuring radiofrequency power by the direct current substitution method, wherein two self-balancing bridges are used; the first bridge containing a thermistor subjected to the radiofrequency power, and the second bridge containing a reference thermistor for establishing a temperature-compensated reference level.

INVENTOR.
Edward Aslan

3,626,290

HIGH-FREQUENCY POWER MEASURING CIRCUIT EMPLOYING TWO SELF-BALANCING BRIDGES

BACKGROUND OF THE INVENTION

This invention relates to precision radiofrequency or microwave power measurement, and more particularly to a temperature-compensated instrument utilizing separate bridge circuits for monitoring radiofrequency power and for establishing a reference for comparison therewith.

The present invention provides for measurement of radiofrequency power by means of the direct current substitution method. It is known that when radiofrequency power is applied to a thermistor element, the resistance of the element changes as it absorbs the radiofrequency power. These elements exhibit a negative temperature coefficient; that is, the resistance decreases when the power is applied. When such a thermistor element is used within a self-balancing bridge, the bridge operates to maintain the net thermistor resistance at a predetermined value. Therefore, since the thermistor resistance decreases because of absorbed microwave power, an equivalent amount of direct current power must be removed from the thermistor to maintain the resistance of the element at the predetermined value. This is what is referred to as direct current substitution. For example, if 10 milliwatts of direct current substituted power is required to achieve bridge balance prior to the application of the radiofrequency power and then 8 milliwatts of radiofrequency power is applied, the total power in the thermistor becomes 18 milliwatts. To return the thermistor resistance to its normal value, 8 milliwatts of direct current substituted power must now be taken out of the thermistor so that the total thermistor power equals 10 milliwatts as before.

The basic problem encountered when attempting precise measurement of radiofrequency power by the direct current substitution method is the accurate measurement of two relatively large voltages or currents differing from each other by small amounts. This problem has been overcome by the accurate measurement of the voltage or current difference between a fixed reference level and the voltage or current change caused by the application of the radiofrequency power to a bridge containing the thermistor.

Some prior measurement bridges employed a single bridge configuration wherein a thermistor element was used as one arm of the bridge. When substituted direct current voltage was the measured quantity, prior to the application of radiofrequency power to the thermistor element, the voltage across the bridge was set to a predetermined amount. The bridge voltage was then measured and recorded. When the radiofrequency power was subsequently applied to the thermistor, the bridge voltage changed with respect to the aforementioned predetermined amount. From this change and the original voltage value, the radiofrequency power can be calculated.

A major source of error with the single bridge measuring circuits was due to the fact that the thermistors were very sensitive to temperature changes and thus the change in voltage across the bridge was due to both the applied radiofrequency power and any temperature changes during the measurement. In addition, these prior known single bridge measuring circuits required setting the thermistor element to precisely the resistance values of the arms in the bridge prior to radiofrequency power measurement in order to avoid errors.

Dual-bridge microwave power measuring circuits have been proposed wherein one bridge is a measuring bridge and the other is the radiofrequency-monitoring bridge. In these circuits, there is temperature compensation because if the thermistors in each bridge are subjected to the same temperature variations during measurement, the effect of temperature changes can be virtually eliminated.

SUMMARY OF THE INVENTION

The power bridge of the present invention attains extreme precision by using self-balancing transistor bridges in a temperature compensation arrangement. According to the invention, there is provided two direct current self-balancing bridges powered by a well-regulated supply. These bridges each include temperature compensated thermistor elements as one arm thereof. One bridge is used for reference purposes and the other is used for monitoring the radiofrequency power. Since the thermistor elements are matched for thermal characteristics, any temperature variation affecting one also affects the other in the same manner. Prior to application of the radiofrequency power, the reference bridge and the radiofrequency bridge are balanced with respect to each other so that the voltages thereacross are identical. When radiofrequency power is applied to the radiofrequency bridge thermistor, the voltage across this bridge changes as the bridge rebalances itself to compensate for the shift in the thermistor resistance. As a result, a voltage difference is created between the reference bridge and the radiofrequency bridge. If, during the power measurement, a variation in ambient temperature occurs, it will affect both bridges in the same manner and thus both bridge voltages will vary by the same amount and the effect will be cancelled out. Therefore, the initial reference bridge adjustment to obtain a zero voltage differential is effective to insure accuracy. All that is necessary is to measure the voltage difference and the reference bridge voltage in order to provide the necessary parameters for calculating the applied radiofrequency power.

An object of the invention is to provide an improved precision radiofrequency power bridge that is temperature compensated.

Another object of the invention is to provide an improved precision radiofrequency power bridge which operates on the direct current substitution method.

According to one aspect of the invention, the self-balancing operation of the bridges is implemented by comparing the voltage drops across the thermistor resistance and the precision fixed resistor of the opposite bridge arm in a differential amplifier. The differential amplifier drives a voltage amplifier and a pair of cascaded power output stages which control the voltage across the entire bridge with respect to ground. With this arrangement, the voltage drop across the thermistor element is maintained equal to that of the fixed resistor regardless of thermistor temperature changes caused by ambient temperature variations and/or applied radiofrequency power.

Another object of the invention is to provide an improved precision radiofrequency power bridge utilizing two self-balancing bridge circuits for measurement of radiofrequency power and development of a temperature-compensated reference value.

Still another object of the invention is to provide a precision radiofrequency power bridge that is much lighter and much more economical than prior instruments of comparable measurement precision.

Specific novel features of the invention are set forth with particularity in the appended claims. The invention itself, however, both as to its organization and method of operation, together with further advantages and features thereof, may be best understood by reference to the following description taken in conjunction with the accompanying drawings.

DESCRIPTION OF THE PREFERRED EMBODIMENTS

Figure 1:
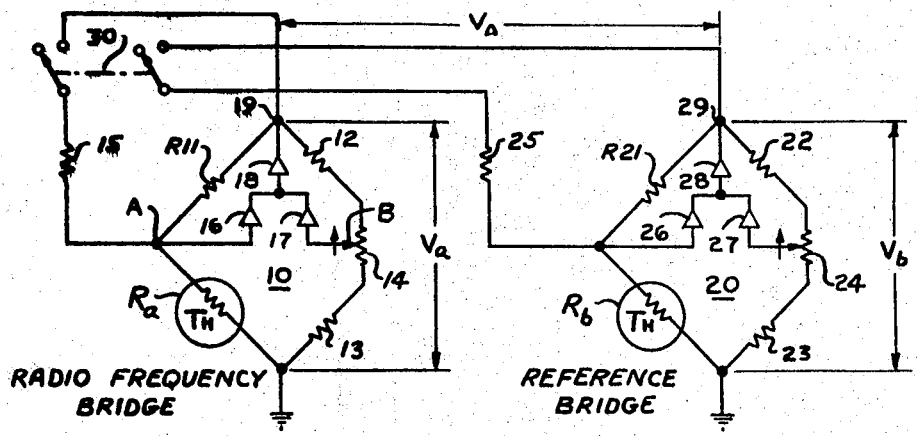
FIG. 1 is a simplified block diagram of an embodiment of the invention illustrating the dual bridge concept employed to measure radiofrequency power by the direct current substitution method.

In order to understand the general functioning of the invention, reference will be made first to FIG. 1. This figure comprises two substantially identical bridges 10 and 20, having a thermistor element $R_a$, $R_b$, respectively, in one arm thereof. Each bridge contains three precision resistors 11, 12, 13 and 21, 22, 23. These resistors are each of the same value and are furthermore of a value substantially the same as that of the thermistor element. Most thermistor units have a net value of either 100 ohms or 200 ohms, and the impedances of the branches having the resistors 11 and 21 are selected to have the same value as that of the thermistor employed. By using 200-ohm resistors for 11 and 21, a switch 30 may be provided to adapt the bridges for use with either 100-ohm or 200-ohm thermistors. Switch 30 is connected to connect resistors 15 and 25 in parallel with resistors 11 and 21, respectively. Thus, if resistors 15 and 25 have an impedance of 200 ohms, their interconnection will balance the bridges when 100-ohm thermistors are used. Manual adjustments in the balancing are made possible by potentiometers 14, 24. These potentiometers provide the junction point on the side of the bridge opposite the thermistors and permit adjustments to the relative impedance of the branches containing resistors 12, 22 and 13, 23.

As pointed out hereinbefore, the bridges are self-balancing. They employ differential amplifiers for sensing the voltage across the balancing diagonal of the bridge. The differential amplifiers in each bridge are symbolically shown as comprising separate amplifying elements 16, 17 and 26, 27. Amplifiers 18 and 28 are connected between the differential amplifiers and the upper junction points 19 and 29, respectively, of each bridge to control the direct current. Any voltage difference which occurs across the balancing diagonal of the bridge due to changes in thermistor resistance as a result of either ambient temperature variations or the application of radiofrequency power, will be sensed by the differential amplifier. The difference in voltage across the bridge is then amplified and used to control the voltage at the top of the bridge with respect to ground.

Radiofrequency power is applied only to the thermistor associated with the radiofrequency bridge. Prior to application of this power, the reference bridge is adjusted so that the voltage $V_b$ thereacross, is exactly equal to the voltage $V_a$ across the radiofrequency bridge. This means that there is no voltage difference, $V_\Delta$ between the junction points 19 and 29 of the bridges. When radiofrequency power is applied to the radiofrequency bridge thermistor $R_a$, the thermistor resistance tends to decrease. Consequently, a voltage difference occurs across the bridge between junction A and B. This difference is sensed and amplified by amplifier means 16, 17, and 18 and there is a decrease in the voltage $V_a$ across the bridge. Thus, bridge 10 has effectively extracted direct current power from thermistor $R_a$ which is equivalent to the radiofrequency power absorbed by the thermistor, and the thermistor resistance is returned to its original value.

In order to calculate the applied radiofrequency power, it is simply necessary to measure and record the reference bridge voltage, $V_b$, and the voltage difference, $V_V$, between the two bridges. These values are then inserted in the equation:

$$\text{Power} = \frac{1}{4R}[2V_b V_\Delta - V_\Delta^2] \quad (I)$$

Where R is equal to the precision resistance R11.

Figure 2:
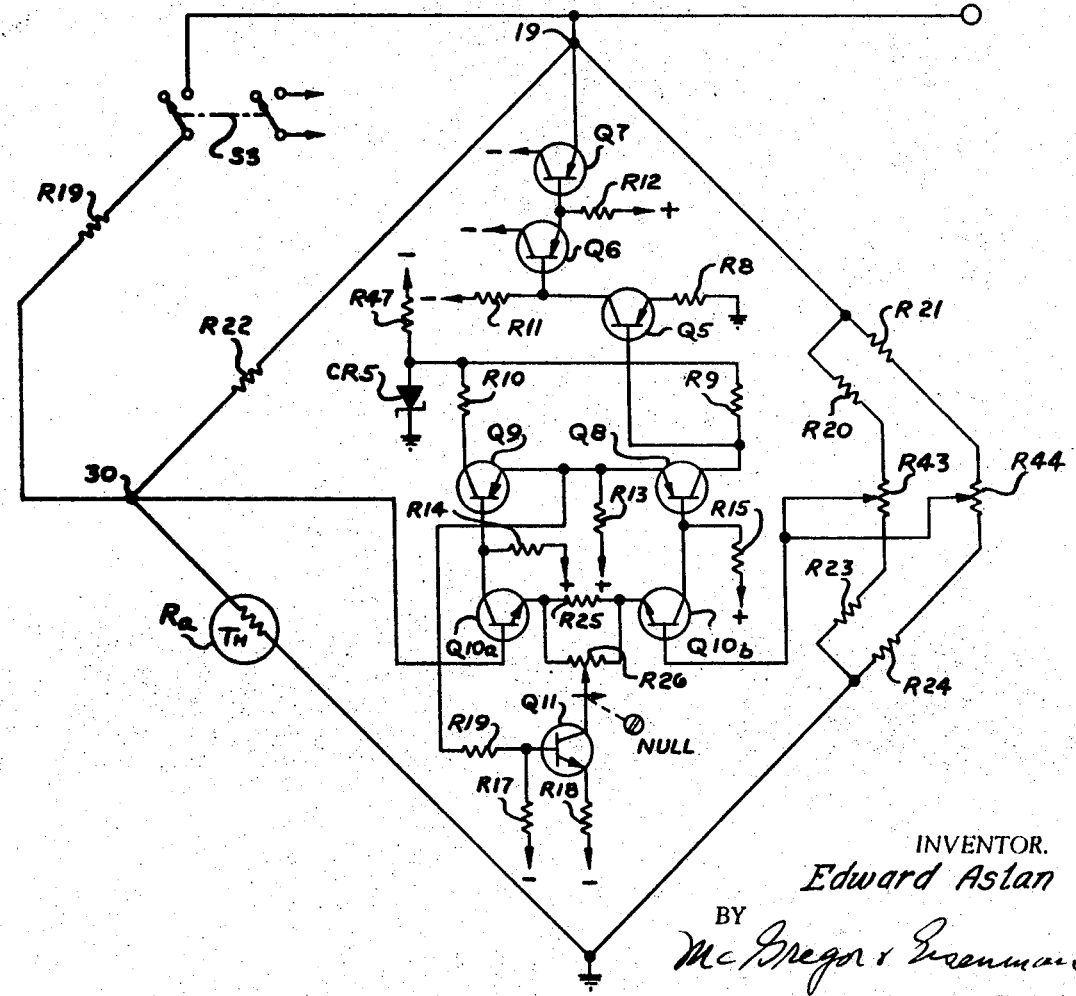
FIG. 2 is a simplified schematic diagram of a single bridge of the type used for either the reference bridge or the radiofrequency bridge of the invention.

FIG. 2 is a simplified schematic drawing showing a bridge of the type used in this invention. For ease in describing the circuitry, it will be seen that alphanumeric designations are used to designate the elements wherein the alphabetical portion indicates the type of element and the numerical portion distinguishes the individual elements.

The basic bridge circuit comprises three precision resistors of equal value R21, R22, and R24 and the radiofrequency thermistor $R_a$. It should be understood that the thermistor will in fact be within a thermistor mount which will be connected to the unit by junction terminals that are provided. If the thermistor has a net value of 200 ohms, each of resistors R21, R22, and R24 would have a similar value. The circuit also includes a switch S3 and a serially associated resistor R19. In the event that a 100-ohm thermistor is employed, switch S3 is closed, placing resistor R19 in parallel with resistor R22; by selecting a resistor R19 of 200 ohms, the closure of switch S3 will reduce the arm containing resistors R19 and R22 to an impedance of 100 ohms for balancing the 100-ohm thermistor.

As previously noted, differential amplifiers are provided in order to make this bridge self-balancing. A first differential amplifier containing transistors Q10a and Q10b is connected across the bridge from junction 30 to the junction established by the adjustable tap on a balancing potentiometer R44 and to the adjustable tap on a vernier potentiometer R43. The functioning of these potentiometers will be explained hereinafter. The differential amplifier is connected in a conventional fashion with the base of each transistor connected to one of the junction points. The emitters are connected together through a resistance R25, which has connected thereacross a potentiometer R26. The collectors of the respective transistors are connected to a positive voltage supply by resistors R14 and R15. The collectors of transistors Q10a and Q10b are further connected to the base electrodes of two further transistors Q9 and Q8, respectively, which also function as a differential amplifier.

Transistors Q9 and Q8 have their emitters connected together and via resistor R13 to the positive voltage supply. Their collectors are connected to a minus voltage reference level via resistors R10 and R9, respectively. The minus voltage reference level is established by a zener diode CR5 connected in series with a resistor R47 between the basic negative voltage supply and ground. Several amplifiers connect the collector of transistor Q8 to the upper junction 19 of the bridge. These amplifiers include transistors Q5, Q6, and Q7. Transistor Q5 has its emitter connected to ground by a resistor R8 and its collector connected to the negative voltage supply by a resistor R11. Transistor Q6 is connected as an emitter follower with its base connected to the collector of transistor Q5, its own collector connected to the negative voltage supply, and its emitter connected to the positive voltage supply via a resistor R12. The base of transistor Q7 is connected to the emitter of transistor Q6, its collector is connected to the negative voltage supply, and its emitter forms the basic connection of the amplifier chain to the junction 19.

The basic bridge also includes a null feedback transistor amplifier Q11 connected between the differential amplifiers. The interconnection of transistor Q11 specifically includes: the collector connected to the adjustable tap on potentiometer R26; the emitter connected via resistor R18 to the negative voltage supply; and the base connected via resistor R19 to the emitters of transistors Q8 and Q9 and via resistor R17 to the negative voltage supply.

The right-hand arms of the bridge, as viewed in FIG. 2, are interconnected by potentiometers R43 and R44. These potentiometers are used in order to provide a means for initially establishing the thermistor impedance. Potentiometer R44 may have an impedance that is quite low relative to the precision bridge resistors R21 and R24. The resistance of thermistor $R_a$ is made slightly lower than that of resistor 22, when the tap on potentiometer R44 is moved downward, and the voltage across the bridge from junction 19 to ground is accordingly made lower.

Vernier potentiometer R43 is connected across the right-hand portion of the bridge by resistors R20 and R23. The resistances of each of these elements is approximately 100 times that of the precision resistors R21, R24, and thus, fine adjusting is provided by positioning of the adjustable tap on vernier potentiometer R43.

When radiofrequency power is applied to thermistor $R_a$, the resistance will decrease due to the effective increase in temperature. As a result, the voltage at the bridge junction 30 decreases (becomes less negative). This creates a difference in potential across the bridge which is sensed by differential amplifier Q10. Since the voltage at the base of transistor Q10a is less negative than the voltage applied to the base of transistor Q10b, conduction through transistor Q10a increases and this in turn causes conduction through associated transistor Q9 to increase.

As previously noted, transistors Q9 and Q8 form a second differential amplifier with a common emitter connection. Thus, increased conduction of transistor Q9 causes the emitters of both transistor Q9 and transistor Q8 to move in a negative direction. This decrease in the emitter potential of transistor Q8 decreases the emitter-to-base forward bias and the collector potential goes more negative. Since the base of transistor Q5 is connected to the collector of transistor Q8 the change in the level of voltage on transistor Q8 causes increased conduction of transistor Q5.

The increased conduction of amplifier Q5 causes the base of emitter follower transistor Q6 to become more positive. Thus, transistor Q6 becomes less conductive and cascaded transistor Q7 also decreases in conduction. The net result of the change in the voltage across the balancing diagonal of the bridge is to decrease the bridge voltage $V_a$. As desired, the bridge has extracted direct current power from the thermistor $R_a$ equivalent to the applied radiofrequency power and the thermistor resistance is returned to its initial impedance.

Figure 3:
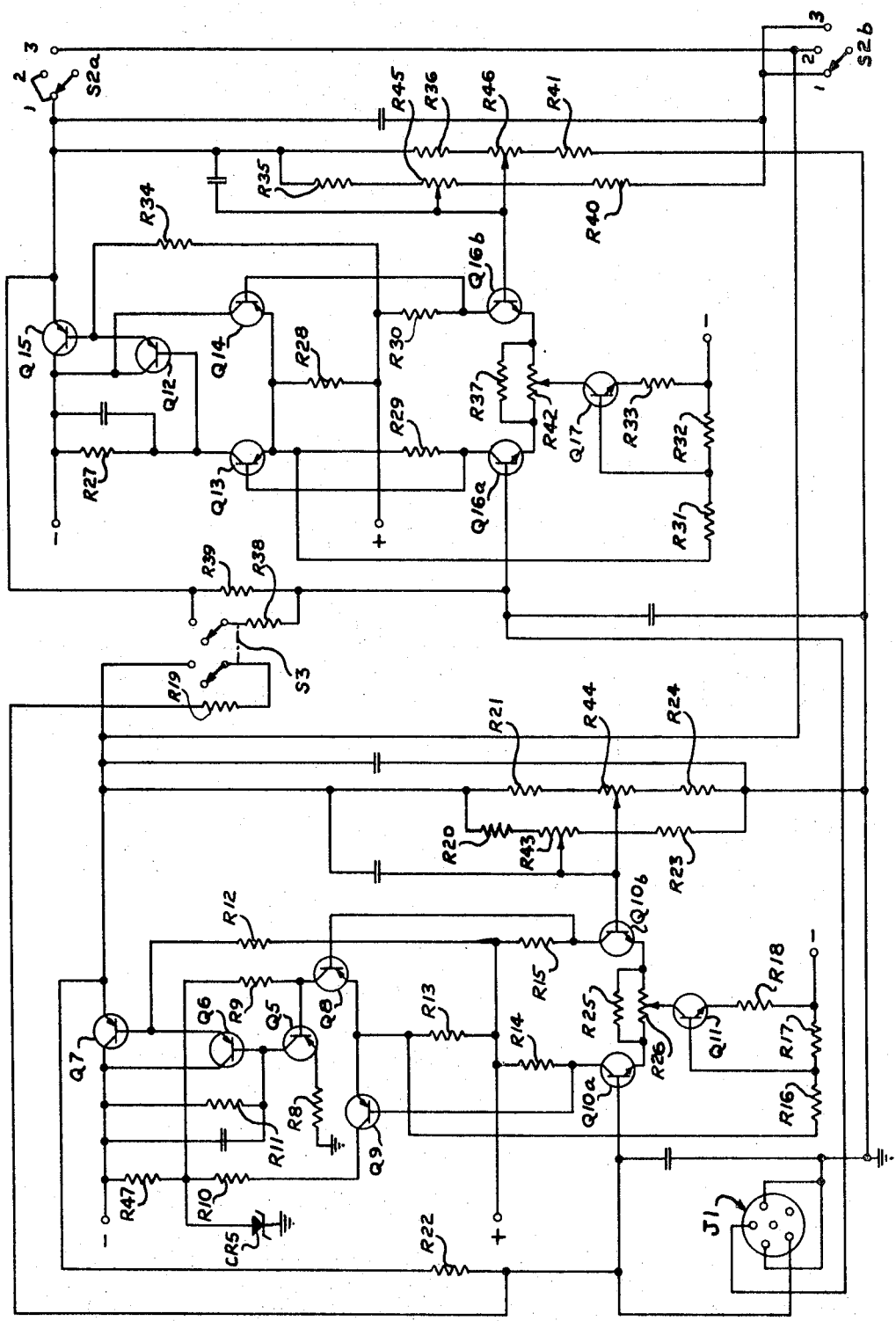
FIG. 3 is a detailed schematic drawing showing a power bridge having both reference and radiofrequency bridge circuits interconnected in order to provide a complete operating instrument.

A complete measuring instrument incorporating the invention comprises two bridge circuits of the nature just described. FIG. 3 illustrates the interconnections required to provide such an instrument. It is not believed to be necessary to describe in detail the connections and operation of FIG. 3, inasmuch as the functioning of the circuit will now be self-evident to those familiar with this art. Nevertheless, several specific points of difference and pertinence in connection with FIG. 3 may be made.

The first point of difference between the reference bridge, which appears on the right of FIG. 3, and the previously described radiofrequency bridge, which appears on the left, resides in the fact that the reference bridge does not require an amplifier equivalent to transistor Q5 of the radiofrequency bridge. Rather, the emitter follower Q12 has its base connected directly to the collector of transistor Q13 which is one element of the second differential amplifier and corresponds to previously discussed transistor Q9. As a result of the elimination of amplifier Q5, it will be seen that a more positive potential is applied to the base of transistor Q12 directly upon the increased conduction of transistor Q13.

The bridges in FIG. 3 also differ from the one shown in FIG. 2, because a number of filtering capacitors have been illustrated. Of course, this addition of capacitors improves operation of the circuits but it is not germane to the invention.

It will also be seen that the thermistors $R_a$ and $R_b$ do not appear in FIG. 3. Instead, a connecting jack J1 is shown at the lower left corner. Since the thermistors are provided in a mount, they will be connected to the power bridge via this type of jack. The actual connections from the jack J1 to the two bridges are apparent and require no further explanation.

In FIG. 3, a switch S2 has been added to facilitate the voltage measurements that are needed to calculate the radiofrequency power with the equation hereinbefore set forth. The switch has two portions S2a and S2b each having three contacts connected to the circuitry. The contacting arms of each portion may be brought out to terminal jacks for easy connection of a precision voltage measuring device. With switch 2 in the first position, $V_b$ will appear between the contacting arms. With switch 2 in the second position, V will appear between the contacting arms. With switch 2 in the third position, $V_a$ will appear between the contacting arms.

It will be apparent to those skilled in the art that numerous modifications may be made in the specific illustrative embodiment of this invention. Although specific circuit arrangements have been proposed for accomplishing the desired objectives of the invention, it is understood that modifications thereof in keeping with the principles of the invention are intended to fall within the scope of the appended claims.

What I claim is:

1. A temperature compensated high-frequency power measuring circuit comprising first and second self-balancing direct current bridge circuits each having a first diagonal with first and second terminals across which a rebalancing signal is applied and a second diagonal across which an error signal may be obtained, and each of said circuits containing a similar temperature variable resistor in one arm thereof which exhibits resistance changes in response to high frequency power changes and in response to ambient temperature changes, means for establishing the same predetermined direct voltage level across the first diagonal of each bridge when no high-frequency power is being applied, means for connecting said first terminals to a source of reference potential, and means for measuring the difference voltage between said second terminals as an indication of high-frequency power being measured after high-frequency power is applied to the temperature variable resistor in one of said bridges only.

2. A temperature compensated high-frequency power measuring circuit according to claim 1, wherein the self-balancing of the bridge circuits is effected by transistor differential amplifier means having its input connected across the second diagonal of each bridge and a transistor amplifier controlled by said differential amplifier means for establishing the rebalancing signal applied to said first diagonal of each said bridge, and wherein said transistor differential amplifier means includes an inverse feedback amplifier.

3. A temperature compensated high-frequency power measuring circuit according to claim 2, including a potentiometer between two arms of each bridge circuit, and an adjustable tap on said potentiometer connected to one side of said differential amplifier means to permit manual adjustment of the voltage across said first diagonal of the bridge.

4. A temperature compensated high-frequency power measuring circuit according to claim 1, wherein said first and second self-balancing direct current bridges are electrically independent.

5. A temperature compensated high-frequency power measuring circuit according to claim 1, utilizing direct current supply means only.

6. A temperature compensated high frequency power measuring circuit according to claim 1, wherein said temperature variable resistors are both subject to the same ambient temperature conditions.

7. A temperature compensated high-frequency power measuring circuit according to claim 1, wherein said first and second self-balancing direct current bridge circuits each contain elements having substantially similar characteristics.

* * * * *

Dedication 3,626,290.—*Edward E. Aslan*, Plainview, N.Y. HIGH-FREQUENCY POWER MEASURING CIRCUIT EMPLOYING TWO SELF-BALANCING BRIDGES. Patent dated Dec. 7, 1971. Dedication filed June 6, 1973, by the assignee, *Hewlett-Packard Company*.

Hereby dedicates the entire remaining term of said patent to the Public.

[*Official Gazette February 12, 1974.*]